(12) United States Patent
Otake et al.

(10) Patent No.: US 9,819,275 B2
(45) Date of Patent: Nov. 14, 2017

(54) POWER SUPPLY DEVICE

(71) Applicant: ROHM CO., LTD., Kyoto-Shi, Kyoto (JP)

(72) Inventors: Hirotaka Otake, Kyoto (JP); Yusuke Nakakohara, Kyoto (JP); Mamoru Tsuruya, Sakado (JP)

(73) Assignee: ROHM CO., LTD., Kyoto (JP)

(*) Notice: Subject to any disclaimer, the term of this patent is extended or adjusted under 35 U.S.C. 154(b) by 0 days.

(21) Appl. No.: 15/303,683

(22) PCT Filed: May 18, 2015

(86) PCT No.: PCT/JP2015/064198
§ 371 (c)(1),
(2) Date: Oct. 12, 2016

(87) PCT Pub. No.: WO2015/178344
PCT Pub. Date: Nov. 26, 2015

(65) Prior Publication Data
US 2017/0025963 A1 Jan. 26, 2017

(30) Foreign Application Priority Data

May 19, 2014 (JP) .................. 2014-103284
Sep. 19, 2014 (JP) .................. 2014-191190

(51) Int. Cl.
*H02M 3/335* (2006.01)
*H02M 1/08* (2006.01)
(Continued)

(52) U.S. Cl.
CPC ......... *H02M 3/33546* (2013.01); *H02M 1/08* (2013.01); *H02M 1/14* (2013.01);
(Continued)

(58) Field of Classification Search
CPC ......... H02M 3/33546; H02M 3/33507; H02M 3/335; H02M 3/33523; H02M 3/3353;
(Continued)

(56) References Cited

U.S. PATENT DOCUMENTS 5,946,206 A * 8/1999 Shimizu ............... H02M 3/285
363/16
6,970,366 B2 * 11/2005 Apeland ............... H02M 3/285
363/132

(Continued)

FOREIGN PATENT DOCUMENTS

| EP | 2058931 | 5/2009 |
| JP | 10-229676 | 8/1998 |

(Continued)

OTHER PUBLICATIONS

PCT Search Report for International Application PCT/JP2015/064198, dated Jul. 14, 2015, 5 pages. (Including English translation).

*Primary Examiner* — Timothy J Dole
*Assistant Examiner* — Sisay G Tiku
(74) *Attorney, Agent, or Firm* — Hamre, Schumann, Mueller & Larson, P.C.

(57) ABSTRACT

A power supply device has resonance-type DC-DC converters of three phases connected in parallel, said converters respectively having operation phases shifted from each other by 120°. The converters include switching circuits, series resonant circuits, and rectifying smoothing circuits, respectively. The series resonant circuits include first transformers, second transformers and resonance capacitors, respectively. Each of primary winding wires of the first transformers, each of primary winding wires of the second transformers, and respective resonance capacitors are connected in series. Each of secondary winding wires of the second transformers is connected to each of the rectifying smoothing circuits.

(Continued)

The first transformers are provided with different cores, respectively, the primary winding wires and the secondary winding wires are insulated from each other by means of dividing bobbins, and the secondary winding wires of respective phases are connected in parallel.

7 Claims, 18 Drawing Sheets

(51) Int. Cl.
  *H02M 1/14* (2006.01)
  *H02M 1/00* (2006.01)
  *H02M 7/48* (2007.01)
  *H02M 3/158* (2006.01)
  *H02M 3/337* (2006.01)
  *H02M 3/28* (2006.01)
(52) U.S. Cl.
  CPC .......... *H02M 3/285* (2013.01); *H02M 3/337* (2013.01); *H02M 2001/0009* (2013.01); *H02M 2001/0058* (2013.01)
(58) Field of Classification Search
  CPC .......... H02M 1/083; H02M 1/08; H02M 1/14; H02M 2001/0009; H02M 2007/4818; H02M 2001/007; H02M 3/1584
  See application file for complete search history.

(56) References Cited

U.S. PATENT DOCUMENTS

| | | | | |
|---|---|---|---|---|
| 9,240,724 | B2* | 1/2016 | Sigamani | H02M 3/285 |
| 2006/0132062 | A1* | 6/2006 | Maru | H02M 3/33592 |
| | | | | 315/291 |
| 2008/0190906 | A1* | 8/2008 | Aigner | H02M 3/335 |
| | | | | 219/130.21 |
| 2008/0298093 | A1* | 12/2008 | Jin | H02M 3/285 |
| | | | | 363/21.06 |
| 2009/0116264 | A1 | 5/2009 | Lin | |
| 2010/0182805 | A1* | 7/2010 | Nishihara | H02M 1/08 |
| | | | | 363/21.02 |
| 2010/0220505 | A1 | 9/2010 | Tsuruya | |
| 2010/0328968 | A1* | 12/2010 | Adragna | H02M 3/335 |
| | | | | 363/21.02 |
| 2012/0262966 | A1* | 10/2012 | Luerkens | H02M 7/066 |
| | | | | 363/127 |
| 2013/0163290 | A1* | 6/2013 | Moon | H02M 3/33592 |
| | | | | 363/21.02 |
| 2014/0111016 | A1* | 4/2014 | He | H02M 3/285 |
| | | | | 307/82 |
| 2014/0254203 | A1* | 9/2014 | Dai | H02M 3/3353 |
| | | | | 363/17 |
| 2015/0103561 | A1* | 4/2015 | Dai | H02M 3/3353 |
| | | | | 363/17 |
| 2015/0180350 | A1* | 6/2015 | Huang | H02J 7/0068 |
| | | | | 307/66 |
| 2015/0318778 | A1* | 11/2015 | Gong | H02M 1/36 |
| | | | | 363/21.02 |
| 2016/0072388 | A1* | 3/2016 | Dubus | H02M 3/1584 |
| | | | | 363/25 |
| 2016/0365803 | A1* | 12/2016 | Torrico-Bascope | H02M 3/33584 |
| 2016/0380547 | A1* | 12/2016 | Chen | H02M 3/22 |
| | | | | 363/17 |
| 2017/0054378 | A1* | 2/2017 | Njiende | H01F 27/2823 |

FOREIGN PATENT DOCUMENTS

| | | |
|---|---|---|
| JP | 2001-078449 | 3/2001 |
| JP | 2004-254440 | 9/2004 |
| JP | 2009-148135 | 7/2009 |

* cited by examiner

FIG. 13

| ITEM | VALUE |
|---|---|
| INPUT/OUTPUT VOLTAGES | 600 V |
| OUTPUT POWER | 5 kW |
| SWITCHING FREQUENCY | 182 kHz |
| Q11-Q32 | SiC MOSFET 1200V40A |
| D13-D34 | SiC SBD 1200V10A |
| C11-C32 | 60 nF |
| EXCITATION INDUCTANCES OF RESPECTIVE PHASES (1, 2, 3) | 110.7, 116.1, 113.7 $\mu$H |
| LEAKAGE INDUCTANCES OF RESPECTIVE PHASES (1, 2, 3) | 12.0, 11.6, 11.6 $\mu$H |

FIG. 18

|  | WITHOUT CURRENT BALANCING | WITH CURRENT BALANCING |
|---|---|---|
| SUM CURRENT AVERAGE VALUE | 17.0 A | 16.7 A |
| AFTER-SUMMATION RIPPLE CURRENT | 6.45 A (37.8%) | 4.30 A (25.7%) |

POWER SUPPLY DEVICE

TECHNICAL FIELD

The present invention relates to power supply devices.

BACKGROUND ART

A resonant switching power supply controls a current or a voltage into a sine wave, and performs switching with either the current or the voltage almost equal zero. This helps dramatically reduce switching loss and noise.

In particular, a serial resonant switching power supply, being a current-voltage resonant circuit, not only helps reduce switching loss but also operates with a smaller surge in the circuit and achieves higher efficiency compared with other circuit designs such as a phase-shift full-bridge design. Because of these benefits, serial resonant switching power supplies have been introduced in many appliances like as power supplies in liquid crystal television sets and servers.

LIST OF CITATIONS

Patent Literature

Patent Document 1: Japanese Patent Application published as No. H10-229676
Patent Document 2: Japanese Patent Application published as No. 2001-78449
Patent Document 3: Japanese Patent Application published as No. 2009-148135

SUMMARY OF THE INVENTION

Technical Problem

Generally, in a serial resonant switching power supply, the output voltage is adjusted through pulse frequency modulation control (PFM control) by switching elements. Here, if Si-based IGBTs (insulated-gate bipolar transistors), which have a comparatively high device withstand voltage, are used as the switching elements, the tail currents that occur when they are turned OFF make it impossible to cope with higher frequencies, and this leads to an unduly large size in isolation transformers. For this reason, conventionally, Si-based MOSFETs (metal-oxide-semiconductor field-effect transistors), which have a comparatively low device withstand voltage, are used as the switching elements. Accordingly, with a configuration where one arm of a half bridge is formed with one device (a single MOSFET), the upper limit of the input voltage that can be input to the serial resonant switching power supply is about 400 V.

Incidentally, in high-power applications, serial resonant circuits are connected in parallel for increased output power. Inconveniently, when the parallel circuits operate with the same phase, the ripple currents in their outputs add up to a high ripple current (e.g., Patent Document 1).

On the other hand, according to a known technology, three-phase serial resonant circuits that are connected in parallel are operated with their respective phases displaced from each other by 120 degrees so as to achieve a balance among their currents. However, for example according to Patent Document 2, balance reactors for different phases are wound around the same core. This makes it difficult to adjust their respective leakage inductances individually, and requires separate provision of a large leakage inductance. Thus, according to Patent Document 2, a large circuit scale is inevitable, and it is difficult to detect individually and safely the currents passing through the balance reactors of different phases.

According to Patent Document 3, the transformer that serves to isolate the primary and secondary sides of the main circuit from each other has a special shape, and this prevents the transformer from being made compact.

Furthermore, in any case, a configuration relying on current balancing suffers from, as a problem intrinsic to the current-balancing function, an overt increase in the output voltage resulting from electromotive forces in balance reactors under a light load.

In view of the above problems encountered by the present inventors, the present invention aims to provide a power supply device that can achieve a balance among the currents respectively passing through serial resonant circuits connected in parallel, without an unnecessary increase in circuit scale.

Means for Solving the Problem

To achieve the above object, according to one aspect of the present invention, a power supply device includes: three-phase resonant DC-DC converters which are connected in parallel between an input node of a DC input voltage and an output node of a DC output voltage and of which the operation phases are displaced from each other by 120 degrees. The resonant DC-DC converters respectively include: switching circuits which convert DC to AC by switching the DC input voltage by using first switching elements respectively; serial resonant circuits which are connected to output nodes of the switching circuits respectively; and rectifying-smoothing circuits which are connected to output nodes of the serial resonant circuits respectively. The serial resonant circuits respectively include first transformers, second transformers, and resonance capacitors. The primary windings of the first transformers, the primary windings of the second transformers, and the resonance capacitors are connected in series with each other respectively. The secondary windings of the second transformers are connected to the rectifying-smoothing circuits respectively. The first transformers respectively include separate cores, and respectively have the primary and secondary windings isolated from each other with leakage inductances present between the primary and secondary windings. The secondary windings of different phases are connected in parallel with each other. (A first configuration.)

In the power supply device according to the first configuration described above, the first transformers may respectively have the primary and secondary windings isolated by split bobbins. (A second configuration.)

The power supply device according to the first configuration described above may further include: a current detection circuit which is provided on the secondary winding side of the first transformers and which detect the currents that pass through the secondary windings; and a control circuit which monitors the resonance state and also controls and protects the first switching elements in accordance with the result of detection by the current detection circuit. (A third configuration.)

The power supply device according to any one of the first to third configurations described above may further include: second switching elements which are respectively provided on the secondary winding side of the first transformers and which respectively short-circuit the secondary windings of the first transformers in accordance with a current balance control signal. (A fourth configuration.)

In the power supply device according to the fourth configuration described above, the current balance control signal may have, when the power supply device is in a light-load condition, such a logic level as to let the secondary windings be short-circuited. (A fifth configuration.)

In the power supply device according to any one of the first to fifth configurations described above, the first switching elements may all be SiC-based MISFETs (metal-insulator-semiconductor field-effect transistors). (A sixth configuration.)

In the power supply device according to any one of the first to sixth configurations described above, the DC output voltage may have a voltage value equal to the voltage value of the DC input voltage. (A seventh configuration.)

In the power supply device according to any one of the first to seventh configurations described above, the rectifying-smoothing circuits may be of a full-wave rectification type. (An eighth configuration.)

In the power supply device according to any one of the first to eighth configurations described above, the rectifying-smoothing circuits may respectively include SiC-based Schottky barrier diodes as rectifying elements. (A ninth configuration.)

The power supply device according to any one of the first to ninth configurations described above may further include: a DC power supply circuit which produces the DC input voltage from a commercial AC voltage. (A tenth configuration.)

The power supply device according to any one of the first to tenth configurations described above may further include: a checker configured to check whether or not a current-balancing operation is normal based on whether or not current oscillation at a frequency other than the resonance frequency of the serial resonant circuits is occurring. (An eleven configuration.)

Advantageous Effects of the Invention

According to the present invention, it is possible to provide a power supply device that can achieve a balance among the currents respectively passing through serial resonant circuits connected in parallel, without an unnecessary increase in circuit scale.

BRIEF DESCRIPTION OF DRAWINGS

FIG. 13 is a table showing measurement conditions;

FIG. 18 is a comparison table of a sum current average value and an after-summation ripple current.

DESCRIPTION OF EMBODIMENTS

<LLC Resonant DC-DC Converter>

Prior to the description of power supply devices embodying the present invention, a description will be given of the basic configuration and operation of an LLC resonant DC-DC converter, which is one of the essential components of those power supply devices.

Figure 1:
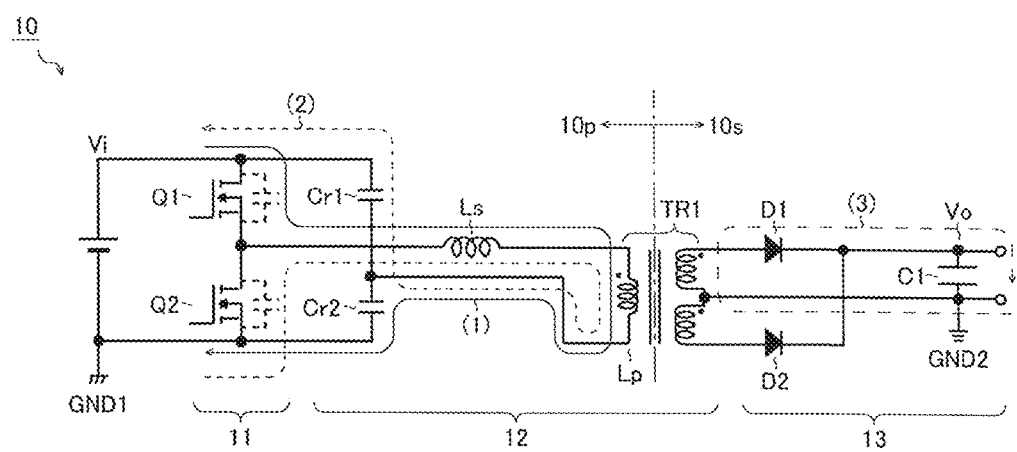
FIG. 1 is a circuit diagram showing one configuration example of an LLC resonant DC-DC converter.

FIG. 1 is a circuit diagram showing one configuration example of an LLC resonance DC-DC converter. The LLC resonance DC-DC converter (hereinafter abbreviated to "DC-DC converter 10") of this configuration example is a power conversion circuit that receives input of a DC input voltage Vi and outputs a DC output voltage Vo, and includes a switching circuit 11, a serial resonant circuit 12, and a rectifying-smoothing circuit 13.

The switching circuit 11 includes switching elements Q1 and Q2 that are serially connected between an application node of the input voltage Vi and a ground node (GND1) of a primary circuit system 10p. The switching circuit 11 turns ON and OFF the switching elements Q1 and Q2 complementarily to switch the DC input voltage Vi, and thereby converts DC electric power to AC electric power. In the present description, "complementarily" covers not only a configuration where the ON/OFF states of the switching elements are completely reversed but also a configuration where the ON/OFF transitions of the switching elements take place with a delay relative to each other (so that there is a period (dead time) in which they are both OFF).

The serial resonant circuit 12 is connected to an output node of the switching circuit 11 (a connection node between the switching elements Q1 and Q2). The serial resonant circuit 12 electrically isolates the primary circuit system 10p (GND1 system) and a secondary circuit system 10s (GND2 system) from each other by use of an isolation transformer TR1, and meanwhile transfers AC electric power from the primary circuit system 10p to the secondary circuit system 10s.

The rectifying-smoothing circuit 13 includes rectification diodes D1 and D2 and a smoothing capacitor C1 that are connected to an output node of the serial resonant circuit 12

(the secondary winding of the isolation transformer TR1). The rectifying-smoothing circuit 13 rectifies and smooths the AC electric power transferred from the primary circuit system 10p, and thereby produces the DC output voltage Vo.

In the DC-DC converter 10 of this configuration example, the serial resonant circuit 12 includes, as circuit elements involved in its resonating operation, reactances Ls and Lp and resonant capacitors Cr1 and Cr2 (each with a capacitance value Cr). In designing the serial resonant circuit 12, it is common, for example in low- to medium-output power supplies of about 500 W or less, to use one isolation transformer TR1, derive a first reactor Ls from the leakage inductance of the isolation transformer TR1, and derive the second reactor Lp from the excitation inductance of the isolation transformer TR1.

Figure 2:
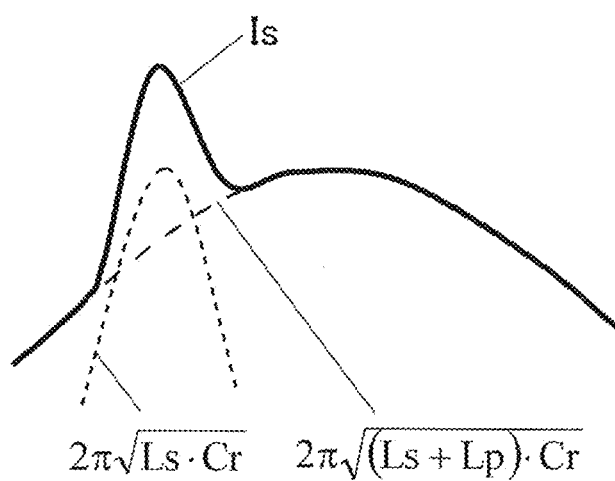
FIG. 2 is a current waveform diagram showing the behavior of a current Is that passes through a reactor Ls.

Through the reactor Ls, a current Is passes via either current path (1) or current path (2) depending on the operating state of the switching circuit 11 (the ON/OFF states of the switching elements Q1 and Q2). With current path (1) in operation, depending on the resonance state, the secondary circuit system 10s conducts, so that a current passes through the rectification diode D1 via current path (3). Of the current that passes through current path (1), a component corresponding to the current that passes through current path (3) passes through the reactor Ls while resonating with a resonance period of $2\pi\sqrt{(Ls \cdot Lc)}$ (see the small-dash line in FIG. 2). The remaining current component passes through the reactor Ls while resonating with a resonance period of $2\pi\sqrt{((Ls+Lp) \cdot Cr)}$ (see the large-dash line in FIG. 2). Accordingly, the current Is, which is the sum of those components, has two resonance frequencies (see the bold solid line in FIG. 2).

Suppose now that, with the switching element Q1 ON and the switching element Q2 OFF, a current is passing via current path (1). When, in this state, the switching element Q1 is turned OFF, the current passing through the reactors Ls and Lp is held, and thus the current path in operation switches from (1) to (2), and this turns ON a reverse parallel diode (or parasitic diode) that accompanies the switching element Q2. When this reverse parallel diode turns ON, the switching element Q2 is left in a state where almost no voltage is applied to it. Accordingly, by turning the switching element Q2 ON during a period in which it is held in that state, it is possible to achieve zero-voltage switching (hereinafter referred to as "ZVS"). In this way, it is possible to dramatically reduce the switching loss and the noise produced in the switching circuit 11.

Incidentally, when the switching element Q1 is turned from ON to OFF as described above, the parasitic capacitance of the switching element Q1 and the reactors Ls and Lp are brought into a state where they are connected in series as seen from a supply power node (the application node of the DC input voltage Vi); accordingly, the voltage across the switching element Q1 rises while resonating (voltage resonance). On the other hand, when the switching element Q1 is ON, the current that passes through the switching element Q1 is made to resonate by the reactors Ls and Lp and the resonant capacitor Cr2 (current resonance). Based on such behavior, the LLC resonant DC-DC converter 10 can be said to be a current-voltage resonance circuit.

First Embodiment

Figure 3:
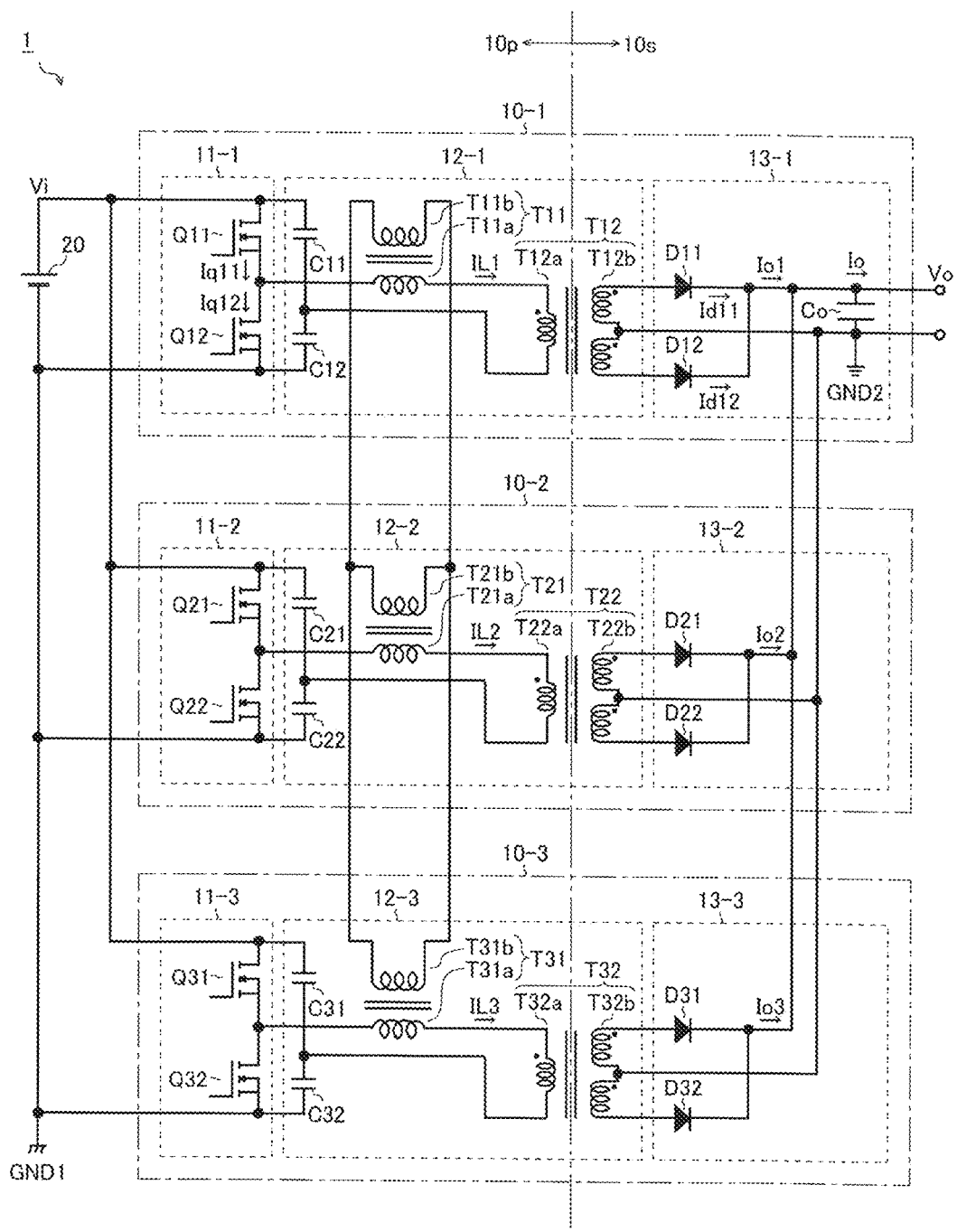
FIG. 3 is a circuit diagram showing a power supply device 1 according to a first embodiment of the present invention.

FIG. 3 is a circuit diagram showing a power supply device 1 according to a first embodiment of the present invention. The power supply device 1 of this embodiment includes three-phase LLC resonant DC-DC converters 10-* (where *=1, 2, and 3, and this applies to any "*" suffixed to reference signs) and a DC power supply circuit 20. In the following description, the LLC resonant DC-DC converters 10-* are abbreviated to "DC-DC converters 10-*".

The DC-DC converters 10-* have a configuration basically similar to that shown in FIG. 1, and are connected in parallel so as to cope with three phases between an input node of a DC input voltage Vi (e.g., DC 800 V) and an output node of an output voltage Vo (e.g., DC 400 V).

The DC power supply circuit 20 feeds the DC input voltage Vi to the DC-DC converters 10-*. Usable as the DC power supply circuit 20 is, for example, an AC-DC converter that produces the DC input voltage Vi from a commercial AC supply voltage Vac (e.g., AC 400 V).

Next, the internal configuration of the DC-DC converters 10-* will be described in detail. Each DC-DC converter 10-* includes a switching circuit 11-*, a serial resonant circuit 12-*, and a rectifying-smoothing circuit 13-*.

The switching circuit 11-* is of a half-bridge type that includes a pair of switching elements Q*1 and Q*2 (both corresponding to a first switching element) serially connected between the application node of the input voltage Vi and the ground node (GND1) of a primary circuit system 10p. The switching circuit 11-* turns ON and OFF the switching elements complementarily to switch the DC input voltage Vi, and thereby converts DC electric power to AC electric power. Usable as the switching elements Q*1 and Q*2 are, for example, SiC-based N-channel MISFETs (which will be described in detail later).

The serial resonant circuit 12-* is connected to an output node of the switching circuit 11-* (a connection node between the switching elements Q*1 and Q*2). The serial resonant circuit 12-* electrically isolates the primary circuit system 10p (GND1 system) and a secondary circuit system 10s (GND2 system) from each other, and meanwhile transfers AC electric power from the primary circuit system 10p to the secondary circuit system 10s.

The serial resonant circuit 12-* includes, as its circuit elements, a first transformer T*1 (corresponding to a balance transformer), which serves for current balancing and resonance, and a second transformer T*2 (corresponding to a main transformer), which serves for input-output isolation and resonance). The first and second transformers T*1 and T*2 include primary windings T*1a and T*2a and secondary windings T*1b and T*2b respectively.

A first end of the primary winding T*1a is connected to the output node of the switching circuit 11-*. A second end of the primary winding T*1a is connected to a first end of the primary winding T*2a. A second end of the primary winding T*2a is connected via a resonance capacitor C*1 to the application node of the input voltage Vi, and is also connected via a resonance capacitor C*2 to the ground node (GND1) of the primary circuit system 10p. That is, the primary winding T*1a of the first transformer T*1, the primary winding T*2a of the second transformer T*2, and the resonance capacitors C*1 and C*2 are connected in series with each other.

The secondary winding T*2b of the second transformer T*2 is of a center-tap type, and is connected to the rectifying-smoothing circuit 13-* in the subsequent stage. The center tap of the secondary winding T*2b is connected to a ground node (GND2) of the secondary circuit system 10s.

Each first transformer T*1 has a separate core, and has the primary and secondary windings T*1a and T*1b isolated from each other by a split bobbin. The secondary windings T*1b of the respective phases are connected in parallel with each other to form a current-balancing circuit. The operation of the current-balancing circuit will be described in detail later.

The rectifying-smoothing circuit 13-* includes rectification diodes D*1 and D*2 and a smoothing capacitor Co that are connected to an output node of the serial resonant circuit 12 (the secondary winding T*2b of the second transformer T*2). The rectifying-smoothing circuit 13-* rectifies and smooths the AC electric power transferred from the primary circuit system 10p, and thereby produces a DC output voltage Vo.

An anode of the rectification diode D*1 is connected to a first end of the secondary winding T*2b. An anode of the rectification diode D*2 is connected to a second end of the secondary winding T*2b. Cathodes of the rectification diodes D*1 and D*2 are both connected to the output node of the DC output voltage Vo. The smoothing capacitor Co is shared among the rectifying-smoothing circuits 13-*, and is connected between the output node of the DC output voltage Vo and the ground node (GND2) of the secondary circuit system 10s.

Although this configuration example deals with a configuration where the secondary winding T*2b of the second transformer T*2 is of a center-tap type and the rectifying-smoothing circuit 13-* is connected in the stage subsequent to it, this is not meant to limit the configuration of the output stage of the power supply device 1; instead, the secondary winding T*2b of the second transformer T*2 may be of a single-tap type, and the rectifying-smoothing circuit 13-* is connected in the stage subsequent to it.

Figure 4:
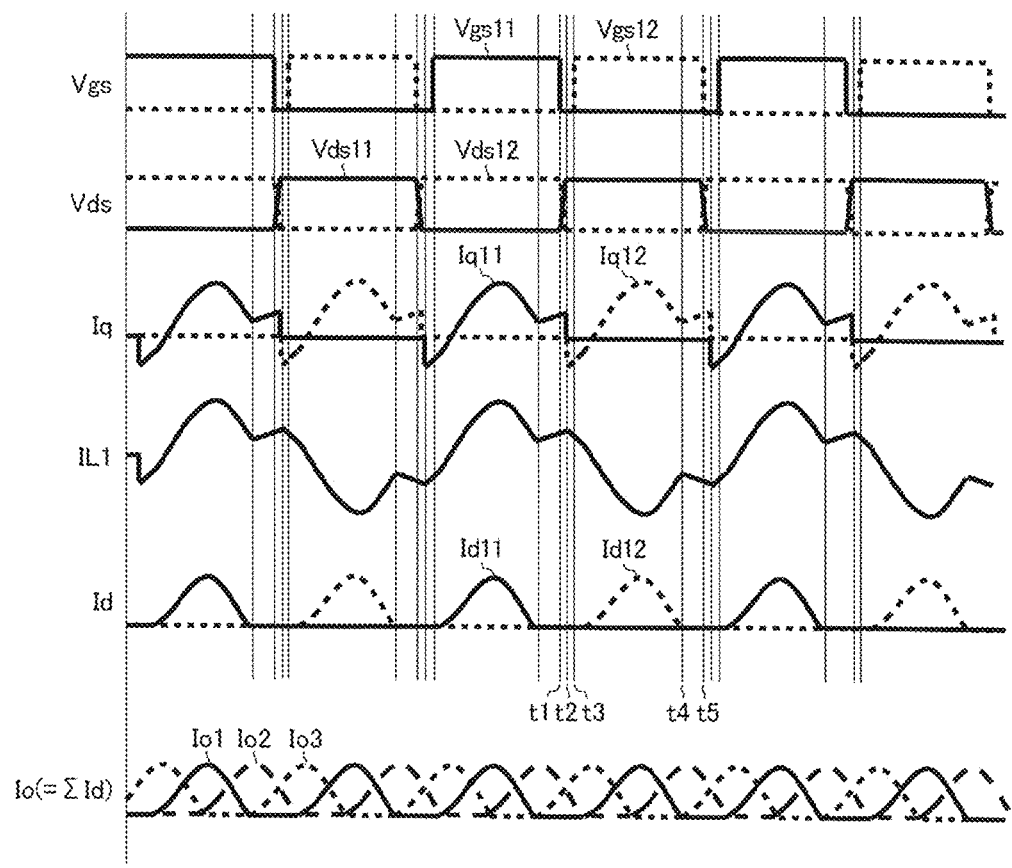
FIG. 4 is a timing chart in illustration of the basic operation of the power supply device 1.

FIG. 4 is a timing chart illustrating the basic operation of the power supply device 1, depicting, from top down, the gate-source voltages Vgs11 and Vgs12 of the switching elements Q11 and Q12, the drain-source voltages Vds11 and Vds12 of the switching elements Q11 and Q12, the switch currents Iq11 and I1qw passing through the switching elements Q11 and Q12, the primary current passing through the primary winding T11a, the secondary currents Id11 and Iq12 passing through the rectification diodes D11 and D12, and the output currents Io* (=Id*1+Id*2) produced by the DC-DC converters 10-* respectively.

In period I (between time points t1 and t2), when the gate-source voltage Vgs11 turns to zero and the switching element Q11 turns OFF, the switch current Iq11 turns to 0 A. At this time, the drain-source voltage Vds11 of the switching element Q11 varies like a sine wave while resonating, before it eventually reaches the DC input voltage Vi. Even when the switching element Q11 is turned OFF, the primary current IL1 is held passing in the same direction as before; thus, the reverse parallel diode (or parasitic diode) of the switching element Q12 turns ON, and the negative-direction switch current Iq12 starts to pass.

In period II (between time points t2 and t3), the switch current Iq12 varies from the negative direction to the positive direction while resonating at a resonance frequency that depends on the leakage inductance of the first transformer T11, the leakage inductance of the second transformer T12, the excitation inductance of the second transformer T12, and the capacitance value of the resonance capacitor C11. At this time, by turning the switching element Q12 ON during a period in which the switch current Iq12 has a negative value (<0 A), it is possible to achieve ZVS.

In period III (between time points t3 and t4), when an induced voltage occurring in the secondary winding T12b of the second transformer T12 rises and the rectification diode D12 is brought into a forward-biased state, the secondary current Id12 passes while resonating at a resonance frequency that depends on the leakage inductance of the first transformer T11, the leakage inductance of the second transformer T12, and the capacitance value of the resonance capacitor C11.

In period IV (between time points t4 and t5), when the secondary current Id12 turns to 0 A in half the switching period due to the rectifying action of the rectification diode D12, thereafter the primary current IL1 passes while resonating at a resonance frequency that depends on the leakage inductance of the first transformer T11, the leakage inductance of the second transformer T12, the excitation inductance of the second transformer T12, and the capacitance value of the resonance capacitor C11.

Thereafter, when the switching element Q12 turns OFF, operation similar to that which takes place during periods I to IV described above takes place in the opposite arm.

The output currents Io* produced by the DC-DC converters 10-* respectively have, when considered on a phase-by-phase basis, a period in which a current passes like a sine wave and a period in which no current passes. Attempting to smooth these currents individually requires large-capacity smoothing capacitors. Seeing that the operation phases of the DC-DC converters 10-* are displaced from each other by 120 degrees, with the three phases considered in parallel, the sum of the output currents Io* (i.e., the eventual output current Io) is always equal to the value observed when the currents passing in the respective phases are equal, and the ripples that occur are small. Accordingly, by, instead of smoothing the output currents Io* individually, smoothing the output current Io, which is their sum, it is possible to reduce the capacitance value of the smoothing capacitor Co.

<Current-Balancing Operation>

Next, the operation of a current-balancing circuit that uses the secondary windings T*1b of the first transformers T*1 will be described in detail with reference to FIGS. 5 to 7.

Figure 5:
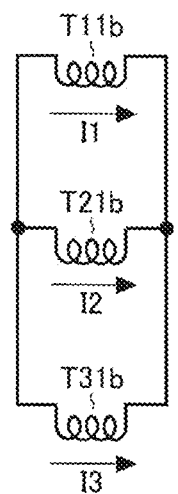
FIG. 5 is a first diagram in illustration of a current-balancing operation.

FIG. 5 is a first diagram (a diagram showing the secondary windings T*1b of the respective phases as they alone are extracted) in illustration of current-balancing operation. When the secondary windings T*1b of the respective phases are connected in parallel as shown there, according to Kirchhoff's laws, the sum (=I1+I2+I3) of the balance currents I* passing through the secondary windings T*1b of the respective phases equals 0 A.

Figure 6:
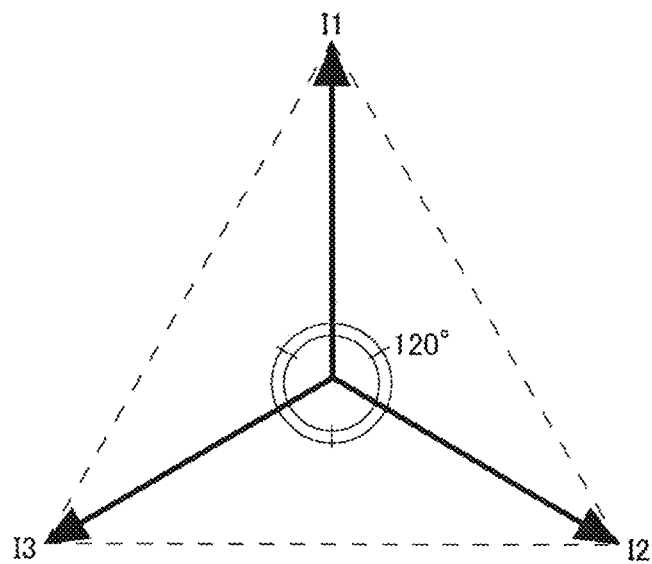
FIG. 6 is a second diagram in illustration of the current-balancing operation.

FIG. 6 is a second diagram (a conceptual diagram showing the balance currents I* passing through the secondary windings T*1b of the respective phases in the form of vectors) in illustration of current-balancing operation. By controlling the DC-DC converters 10-* with their operation phases displaced from each other by 120 degrees as shown there, the vector sum of the balance currents I* equals zero, and thus the absolute values of the balance currents I* are unambiguously equal. Accordingly, making the turn ratios of the first transformers T*1 of the respective phases equal results in making the primary currents IL* passing through the primary windings T*1a of the respective phases equal, and it is then possible to achieve current-balancing operation.

Incidentally, as will be clear from FIG. 6, to achieve current-balancing operation as described above, the number of parallel connected DC-DC converters 10-* has to be three (or a multiple of three). For example, in a case where six of them are connected in parallel, six-phase DC-DC converters can be divided into two sets each comprising three-phase DC-DC converters, and for each set, the three-phase DC-DC converters can be controlled with their operation phases displaced from each other by 120 degrees. In that case, it does not matter whether the operation phases of the different sets are identical or not.

Figure 7:
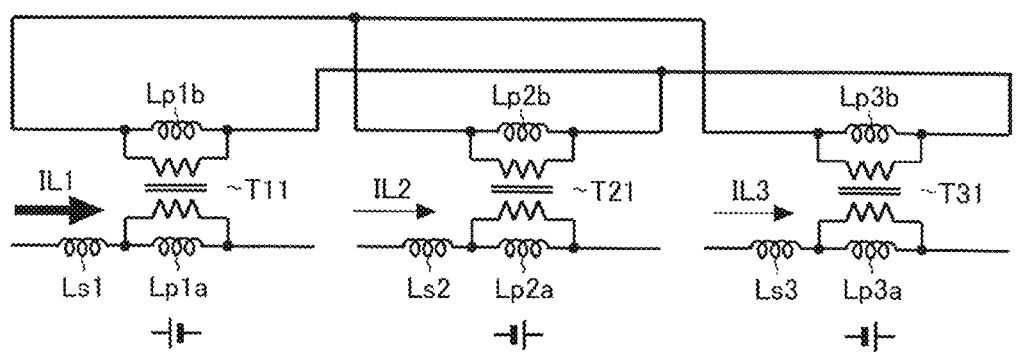
FIG. 7 is a third diagram in illustration of the current-balancing operation.

FIG. 7 is a third diagram (a circuit diagram of the first transformers T*1 of the respective phases as they alone are extracted) in illustration of current-balancing operation. The symbol Lp*a represents the excitation inductances on the primary side, and the symbol Lp*b represents the excitation inductances on the secondary side. The symbol Ls* represents the leakage inductances on the primary side.

The current-balancing operation described above, whereby the primary currents IL* of the respective phases are made equal, is achieved by electromotive forces in the excitation inductances Lp*a and Lp*b. However, when the waveforms of the primary currents IL* passing in the respective phases are identical except for the phase from the beginning, the excitation inductances Lp*a and Lp*b do not produce electromotive forces but remain in an electrically short-circuited state. Accordingly, as for the first transformers T*1, substantially only the leakage inductances Ls* appears to be present.

On the other hand, when the primary currents IL* passing in the respective phases differ, the excitation inductances Lp*a and Lp*b produce electromotive forces to increase or decrease the primary currents IL*, and thereby make them equal. As a result, at this time, the input voltages applied across the leakage inductances Ls* appear to be increased or decreased.

For example, when the primary current IL1 passing through the first transformer T11 increases as shown in FIG. 7, the excitation inductances Lp1a and Lp1b produce such electromotive forces as to decrease the input voltage applied across the leakage inductance Ls1.

The leakage inductances Ls* of the first transformers T*1 can be used as resonance reactors for the serial resonant circuits 12-*. This permits the leakage inductances of the second transformers T*2 to be designed to be lower than is conventionally usual. Distributing part of the resonance conditions to the first transformers T*1 in this way helps alleviate the restrictions on the leakage inductances of the second transformers T*2, and thus helps achieve size reduction in the second transformers T*2.

The first transformers T*1 each have a separate core, and have the primary and secondary windings T*1a and T*1b structurally separated from each other by a split bobbin. With this structure, it is possible to obtain high leakage inductances Ls* in the first transformers T*1 and to adjust them individually according to the circuit constant errors in the respective phases, and it is thus possible to suppress variation of the output voltage Vo due to current-balancing operation among the different phases resulting from uneven resonance conditions.

<Split Bobbin>

Figure 8:
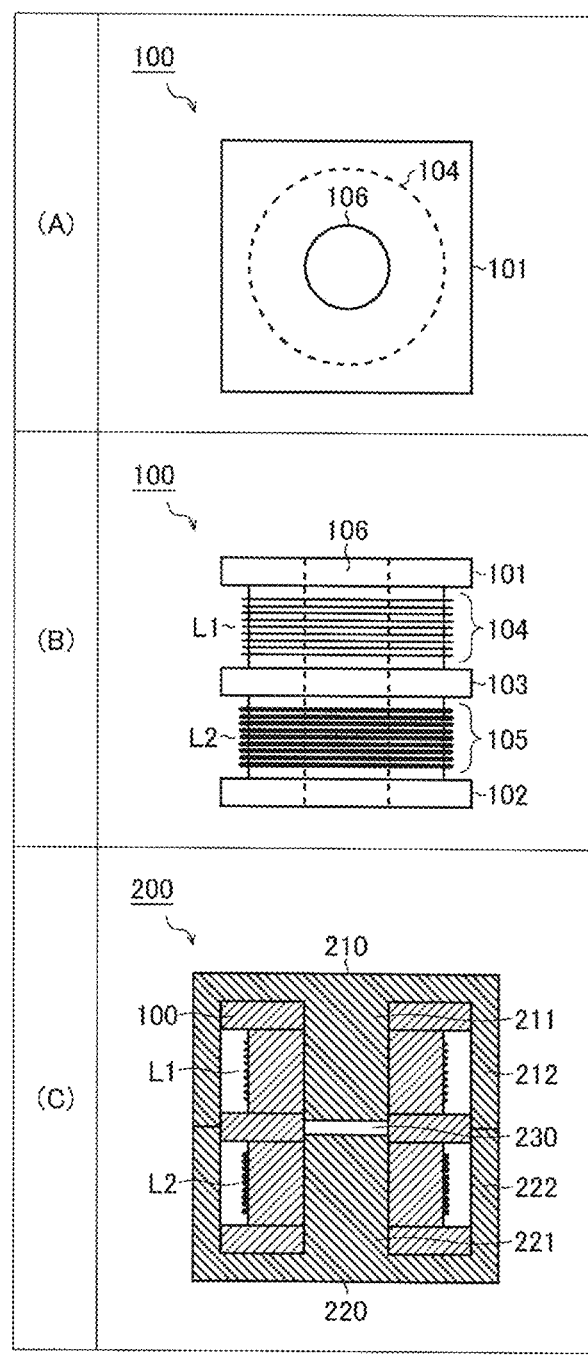
FIG. 8 is a schematic diagram showing one configuration example of a split bobbin.

FIG. 8 is a schematic diagram showing one configuration example of a split bobbin used in the first transformer T*1. In box (A) is a top view (a view from above) of the split bobbin 100; in box (B) is a side view of the split bobbin 100; and in box (C) is a longitudinal sectional view of the split bobbin 100 and a core 200 (a longitudinal sectional view of the first transformer T*1).

The split bobbin 100 is an electrically insulating member (e.g., a member formed of plastic) that has a top portion 101, a bottom portion 102, a splitting portion 103, a first reel portion 104, a second reel portion 105, and a cavity portion 106. The first reel portion 104, around which a primary winding L1 (corresponding to the primary winding T*1a mentioned previously) is wound, and the second reel portion 104, around which a secondary winding L2 (corresponding to the secondary winding T*1b mentioned previously) is wound, are structurally isolated from each other by the splitting portion 103.

It is preferable that the primary and secondary windings L1 and L2 be designed such that whichever is subjected to a higher current is given a larger thickness. For example, in a case where the turn ratio of the first transformer T*1 is so designed as to handle a high voltage with a low current on the primary winding T*1a side and a low voltage with a high current at the secondary winding T*1b side, it can be said that it is preferable that the secondary winding L2 be designed to be thicker than the primary winding L1.

The core 200 is composed of a pair of E-shaped core members 210 and 220 that form a closed magnetic circuit by holding the split bobbin 100 from opposite sides, that is, from above and below. The E-shaped core members 210 and 220 respectively have middle leg portions 211 and 221 and side leg portions 212 and 222. The middle leg portions 211 and 221 are each a circular cylinder-form member that is inserted into the cavity portion 106 of the split bobbin 100. The side leg portions 212 and 222 are each a wall-form member that rises so as to surround the middle leg portions 211 or 221 and that entirely or partly covers the circumferential rims of the split bobbin 100.

The middle leg portions 211 and 221 are inserted into the cavity portion 106 in the split bobbin 100 such that the tip faces of the middle leg portions 211 and 221 abut on each other. Likewise, the side leg portions 212 and 222 entirely or partly cover the circumferential rims of the split bobbin 100 such that the tip faces of the side leg portions 212 and 222 abut on each other. Incidentally, the leakage inductance Ls* of the first transformer T*1 can be increased and decreased by appropriately trimming the tip faces of the middle leg portions 211 and 221 and thereby adjusting the gap portion 230 (gap width) between them.

By forming the first transformers T*1 by use of the split bobbin 100 configured as described above, it is possible to obtain high leakage inductances Ls* in the first transformers T*1, and to adjust them individually according to the circuit constant errors in the respective phases.

<Adopting SiC-Based MISFETs>

In cases where the power supply device 1 is for high-power applications, as the switching elements Q*1 and Q*2 used in the switching circuits 11-*, it is preferable to use, instead of Si-based IGBTs or MOSFETs, SiC-based MISFETs, which have higher withstand voltages (e.g., resistant to up to 900 V to 1200 V) and which are capable of high-frequency operation.

A wide-bandgap semiconductor such as SiC has a high dielectric breakdown electric-field intensity (in contrast to 0.3 MV/cm with Si, 2.8 MV/cm with SiC). This allows, when fabricating FETs, a design with a small thickness in a withstand voltage retention drift layer combined with a high carrier concentration. Accordingly, with the same chip area, a SiC-based chip has a lower ON-state resistance than (one-tenth of) that of a Si-based chip; that is, the former provides the same ON-state resistance with a smaller chip area. It is thus possible to reduce the parasitic capacitances of FETs and achieve fast operation. With the same carrier concentration profile, a SiC-based chip provides a higher device withstand voltage than that of a Si-based chip.

That is, using SiC-based MISFETs as the switching elements Q*1 and Q*2 makes it possible to accept input of a higher DC input voltage Vi than when Si-based MOSFETs are used, and makes it possible to set the switching frequency higher than when Si-based IGBTs are used. In this way, it is possible to build a compact, high-capacity power supply device 1 without unnecessarily increasing the number of parallel connected DC-DC converters 10-*.

For example, in the current-balancing operation described previously (see FIGS. 5 to 7), the number of parallel connected DC-DC converters 10-* has to be three (or a multiple of three), and this imposes a limit in increasing the electric power handled so long as Si-based MOSFETs are used as the switching elements Q*1 and Q*2. However, by using SiC-based MISFETs as the switching elements Q*1 and Q*2, it is possible to set the DC input voltage Vi at, for example, 600 V or more, and it is thus possible to achieve higher capacity without any special measure such as by connecting FETs in series for a higher withstand voltage.

However, the higher the DC input voltage Vi, the higher the use magnetic flux density in the second transformers T*2, which serve for input-output isolation and resonance, and it is then important to suppress their magnetic saturation. Here, when Si-based IGBTs or the like are used as the switching elements Q*1 and Q*2, the switching frequency has to be set at, for example, 20 kHz or less. Accordingly, to reduce the use magnetic flux density in the second transformers T*2, it is necessary to increase the effective cross-sectional area of the cores or increase the number of turns of the primary and secondary windings T*2a and T*2b, leading to an increased size in the second transformers T*2.

By contrast, when SiC-based MISFETs, which are capable of operating at higher frequencies, are used as the switching elements Q*1 and Q*2, the switching frequency can be set at, for example, 150 kHz or more, and this helps reduce the use magnetic flux density in the second transformers T*2 and suppress their magnetic saturation without unnecessarily increasing the effective cross-sectional area of the cores or the number of turns in the windings. It can be said that this, in combination with the previously-mentioned distribution of part of resonance reactors to the first transformers T*1, is highly effective in achieving a smaller size in the second transformers T*2.

Second Embodiment

Figure 9:
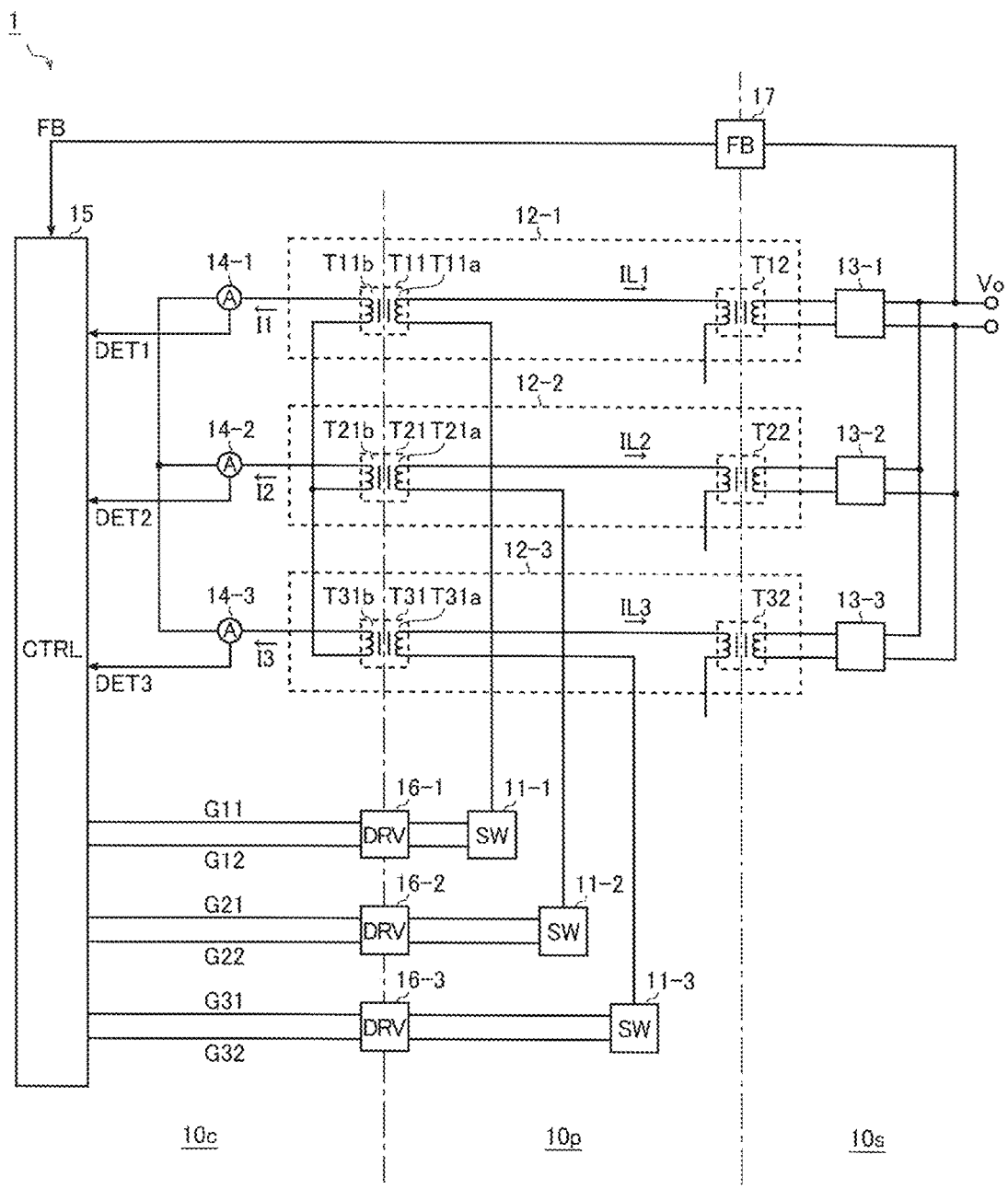
FIG. 9 is a circuit diagram showing a power supply device 1 according to a second embodiment of the present invention.

FIG. 9 is a circuit diagram showing a power supply device 1 according to a second embodiment of the present invention. The power supply device 1 of this embodiment has a configuration basically similar to that in the first embodiment described previously, and is characterized in additionally including current detection circuits 14-* on the secondary winding T*1b side of the first transformers T*1. Accordingly, such components as find their counterparts in the first embodiment are identified by the same reference signs as in FIG. 3, and no overlapping description will be repeated; the following description focuses on the features unique to the second embodiment.

The power supply device 1 of the second embodiment includes, in addition to the circuit elements of the DC-DC converters 10-*, namely the switching circuits 11-*, the serial resonant circuits 12-*, and the rectifying-smoothing circuits 13-*, current detection circuits 14-*, a control circuit 15, insulated-gate driver circuits 16-*, and an output feedback circuit 17.

The current detection circuits 14-* are provided in a control circuit system 10c (on the secondary winding T*1b side of the first transformers T*1), which is electrically isolated from the primary and second circuit systems 10p and 10s. The current detection circuits 14-* detect the balance currents I* passing through the secondary windings T*1b respectively to produce balance current detection signals DET*, and feed these to the control circuit 15.

The control circuit 15 is provided in the control circuit system 10c, and functions as the principal controlling agent of the switching circuits 11-*. More specifically, the control circuit 15 produces gate signals G*1 and G*2 having a frequency commensurate with a feedback signal FB fed from the output feedback circuit 17, and feeds them via the insulated-gate driver circuits 16-* to the switching circuits 11-* (and hence to the switching elements Q*1 and Q*2). Through output feedback control like this, the desired output voltage Vo can be produced.

The control circuit 15 also has the functions of, in accordance with the balance current detection signals DET* fed from the current detection circuits 14-*, monitoring the resonance state and controlling and protecting the switching elements Q*1 and Q*2. For example, in a case where the serial resonant circuits 12-* have gone into an abnormally resonant state, or the balance currents I* (and hence the primary currents IL* and hence the switch currents Iq*1 and Iq*2 passing through the switching elements Q*1 and Q*2) have gone into an overcurrent state, the control circuit 15 can forcibly stop the ON-OFF operation of the switching elements Q*1 and Q*2, and this helps enhance the safety of the power supply device 1.

The insulated-gate driver circuits 16-* electrically isolate the control circuit system 10c and the primary circuit system 10p from each other, and meanwhile deliver the gate signals G*1 and G*2 from the control circuit 15 to the switching circuits 11-*.

The output feedback circuit 17 electrically isolates the secondary circuit system 10s and the control circuit system 10c from each other, and meanwhile generates a feedback signal FB in accordance with the output voltage Vo and transfers it to the control circuit 15.

Of the circuit elements mentioned above, the control circuit 15, the insulated-gate driver circuits 16-*, and the output feedback circuit 17 are provided also in the first embodiment described previously (through not illustrated in FIG. 3 for the sake of convenient illustration).

As mentioned previously, the primary and secondary windings T*1a and T*1b of the first transformers T*1 are structurally separated from each other by the split bobbin 100 (see FIG. 8). Thus, the primary circuit system 10p and the control circuit system 10c are electrically isolated from each other completely. Accordingly, providing the current detection circuits 14-* in the control circuit system 10c makes it possible to safely and individually detect the balance currents I* passing in the respective phases (and hence the primary currents IL* and hence the switch currents Iq*1 and Iq*2 passing through the switching elements Q*1 and Q*2).

In particular, in a power supply device 1 for high-power applications where DC-DC converters 10-* are connected in parallel, the DC input voltage Vi is very high, and it is therefore preferable that the current detection circuits 14-* and the control circuit 15 be electrically isolated from the primary circuit system 10p.

It is preferable that additional circuits such as the current detection circuits 14-* be attached not to the second transformers T*2 for input-output isolation and resonance but to the first transformers T*1 for current balancing and resonance. With this configuration, the second transformers T*2 do not have to be given a special structure, and thus their size can be reduced. It can be said that this, in combination with the previously mentioned distribution of part of resonance reactors to the first transformers T*1 and the previously mentioned adoption of SiC-based MISFETs for faster switching, is highly effective in reducing the size of the second transformers T*2.

Third Embodiment

Figure 10:
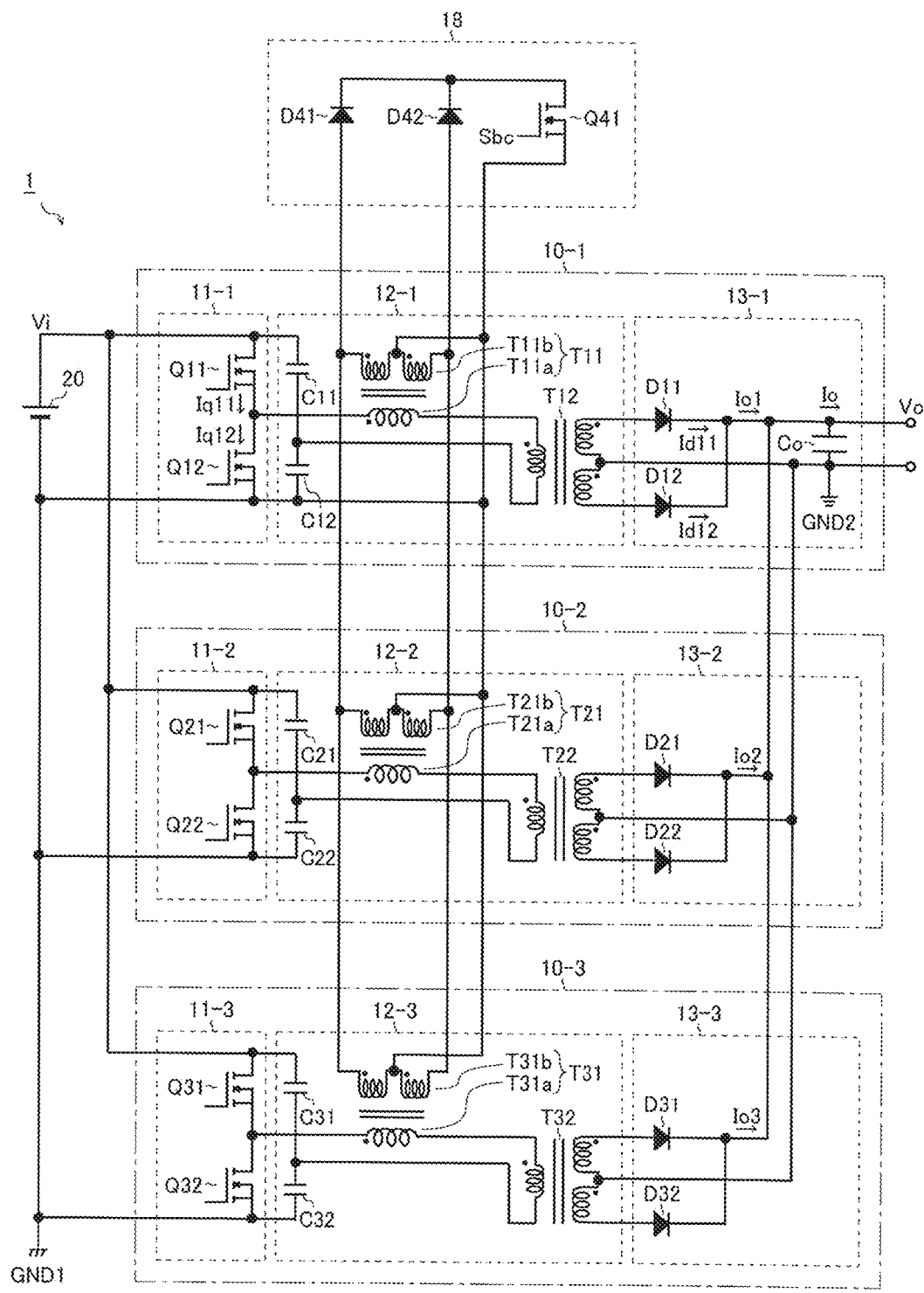
FIG. 10 is a circuit diagram showing a power supply device 1 according to a third embodiment of the present invention.

FIG. 10 is a circuit diagram showing a power supply device 1 according to a third embodiment of the present invention. The power supply device 1 of the third embodiment has a configuration basically similar to that in the first embodiment described previously, and is characterized by additionally including a current balance control circuit 18 on the secondary winding T*1b side of the first transformers T*1. Accordingly, such components as find their counterparts in the first embodiment are identified by the same reference signs as in FIG. 3, and no overlapping description will be repeated; the following description focuses on the features unique to the third embodiment.

The current balance control circuit 18 includes a switching element Q41 (corresponding to a second switching element) and diodes D41 and D42. As the switching element Q41, for example, an N-channel MOSFET can be suitably used. The addition of the current balance control circuit 18 is accompanied by the replacement of the secondary windings T*1b of all the first transformers T*1 with windings of a center-tap type.

A drain of the switching element Q41 is connected to cathodes of the diodes D41 and D42. A source of the switching element Q41 is connected to the center taps of the secondary windings T*1b (the ground node GND1 of the primary circuit system 10p). To a gate of the switching element Q41, a current balance control signal Sbc is applied. An anode of the diode D41 is connected to the first ends of the secondary windings T*1b. An anode of the diode D42 is connected to the second ends of the secondary windings T*1b.

In the current balance control circuit 18 configured as described above, by turning the switching element Q41 ON, it is possible to short-circuit the secondary windings T*1b, and thereby to stop the current-balancing operation described previously. The diodes D41 and D42 are provided to inhibit a current that tends to pass through the body diode of the switching element Q41.

Figure 11:
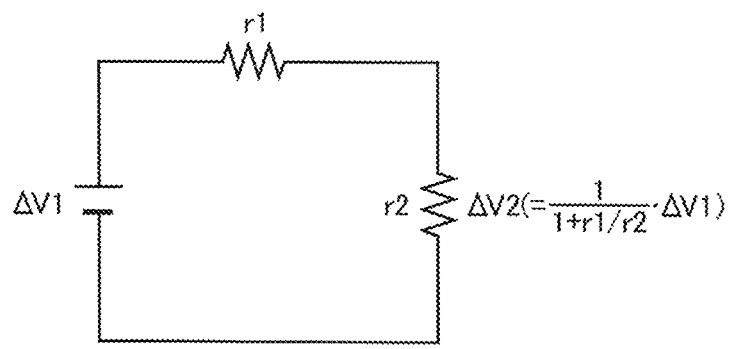
FIG. 11 is an equivalent diagram in illustration of output variation under a light load.

Now, the technical significance of the current balance control circuit 18 will be described in detail with reference to FIG. 11. FIG. 11 is an equivalent circuit diagram in illustration of output variation under a light load (corresponding to an equivalent circuit diagram of the power supply device 1). In the diagram, the symbols r1, r2, ΔV1, and ΔV2 represent the input impedance and the load impedance of the power supply device 1, the variation of the DC input voltage Vi, and the variation of the DC output voltage Vo, respectively, and among these parameters, the relationship ΔV2=ΔV1/[1+(r1/r2)] holds.

As described previously with reference to FIG. 7, the electromotive forces that occur in the excitation inductances Lp*a and Lp*b when the primary currents IL* of the respective phases differ appear to cause the leakage inductances Ls* of the first transformers T*1 to increase and decrease. That is, in a phase where the primary current IL* is lower, current balancing operates in such a direction as to decrease the leakage inductance Ls* and increase the primary current IL*; reversely, in a phase where the primary current IL* is higher, current balancing operates in such a direction as to increase the leakage inductance Ls* and decrease the primary current IL*.

Accordingly, when current balancing is operating, the leakage inductances Ls* of the first transformers T*1 can temporarily appear to be small. The output impedance r1 of the power supply device 1 is a variable parameter (ωLs*) ascribable to inductors, and varies as the leakage inductances Ls* increase and decrease. However, the output impedance r1 basically exhibits a high value to the amount of the variation ΔV2 (with a switching frequency f of the order of megahertz) in the DC output voltage Vo that results from current-balancing operation. Accordingly, under a heavy load, even when current-balancing operation causes variation in the output impedance r1, this hardly affects the amount of variation ΔV2. On the other hand, under a light load, variation in the output impedance r1 that accompanies current-balancing operation appears as the amount of the variation ΔV2 in the DC output voltage Vo.

This phenomenon (a rise in output under a light load) occurs precisely because current-balancing operation is performed. Thus, for example, by monitoring the load state (the magnitude of the input current Io) by use of the control circuit 15, and switching the logic level of the current balance control signal Sbc in such a manner that the secondary windings T*1b are short-circuited and thereby current-balancing operation is suspended when the power supply device 1 is in a light-load condition, it is possible to avoid the above-mentioned phenomenon (a rise in output under a light load).

As mentioned previously, in the first transformers T*1, the primary and secondary windings T*1a and T*1b are structurally separated from each other by use of the split bobbin 100 (see FIG. 8), and thus the control for suspending the current-balancing function can be performed safely in the control circuit system 10c, which is electrically isolated from the primary circuit system 10p.

Fourth Embodiment

Figure 12:
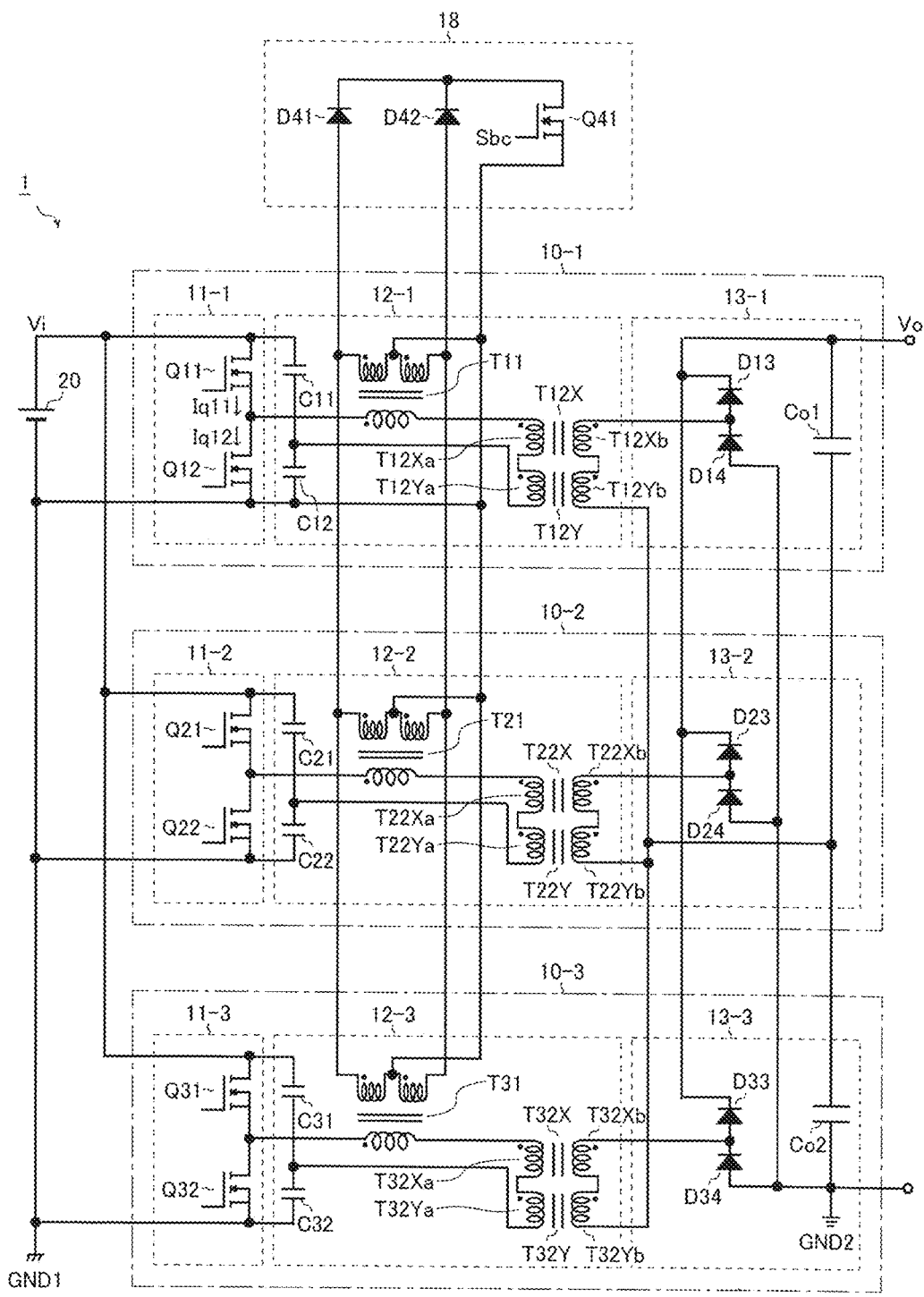
FIG. 12 is a circuit diagram showing a power supply device 1 according to a fourth embodiment of the present invention.

FIG. 12 is a circuit diagram showing a power supply device 1 according to a fourth embodiment of the present invention. The power supply device 1 of the fourth embodiment has a configuration basically similar to that in the third embodiment described previously, and is characterized by being configured to produce a DC output voltage Vo that has the same voltage value as the DC input voltage Vi (configured simply to isolate the primary circuit system 10p and the secondary circuit system 10s from each other). Accordingly, such components as find their counterparts in the third embodiment are identified by the same reference signs as in FIG. 10, and no overlapping description will be repeated; the following description focuses on the features unique to the third embodiment.

In the power supply device 1 according to the fourth embodiment, to adapt to the above-mentioned change in configuration, two serially connected second transformers T*2X and T*2Y with a turn ratio of 1:1 are used as main transformers for input-output isolation and resonance, and the configuration of the rectifying-smoothing circuits 13-* has been changed.

The second transformers T*2X and T*2Y include primary windings T*2Xa and T*2Ya and secondary windings T*2Xb and T*2Yb respectively. First ends of the primary windings T*2Xa are connected to the primary windings T*1a of the first transformers T*1. Second ends of the primary windings T*2Xa are connected to first ends of the primary windings T*2Ya. Second ends of the primary windings T*2Ya are connected to the resonance capacitors C*1 and C*2.

The rectifying-smoothing circuits 13-* include rectification diodes D*3 and D*4, one each for each phase, and smoothing capacitors Co1 and Co2, common to all the phases. Anodes of the rectification diodes D*3 and cathodes of the rectification diodes D*4 are all connected to first ends of the secondary windings T*2Xb. Second ends of the secondary windings T*2Xb are connected to first ends of the secondary windings T*2Yb. Cathodes of the rectification diodes D*3 are connected to the output node of the output voltage Vo. Anodes of the rectification diodes D*4 are connected to the ground node (GND2) of the secondary circuit system 10s. A first end of the smoothing capacitor Co1 is connected to the output node of the DC output voltage Vo. A second end of the smoothing capacitor Co1 and a first end of the smoothing capacitor Co2 are both connected to second ends of the secondary windings T*2Yb. A second end of the smoothing capacitor Co2 is connected to the ground node (GND2) of the secondary circuit system 10s.

With the circuit configuration described above, the power supply device 1 according to the fourth embodiment produces a DC output voltage Vo that has the same voltage value as the DC input voltage Vi, and simply isolates the primary circuit system 10p and the secondary circuit system 10s from each other.

In the power supply device 1 according to the fourth embodiment, the DC output voltage Vo is higher than in the first to third embodiments, and thus as the rectification diodes D*3 and D*4, it is preferable to use SiC-based Schottky barrier diodes or the like, which have a high withstand voltage (resistant to up to 900 V to 1200 V) combined with a low forward voltage drop. By adopting a configuration like this, it is possible to further improve the efficiency of the power supply device 1 for high-power applications.

Moreover, in the power supply device 1 according to the fourth embodiment, as main transformers for input-output isolation and resonance, two serially connected second transformers T*2X and T*2Y are used. With this configuration, it is possible to reduce the voltage applied to each transformer to one-half, and thus to disperse the generated heat and avoid magnetic saturation.

As described in connection with the first to third embodiments, the size of the main transformers can be reduced satisfactorily by (1) distributing part of resonance reactors to the first transformers T*1, (2) adopting SiC-based MISFETs for higher switching, and (3) simplifying the second transformers T*2 by adding a circuit to the first transformers T*1. Accordingly, dividing the main transformers into two second transformers T*2X and T*2Y does not result in making them unduly bulky.

<Actual Measurement Data>

Next, an example of results of actual measurement of the operating waveforms observed at relevant points in the power supply device 1 according to the fourth embodiment will be presented. FIG. 13 is a table showing the measurement conditions. As shown there, in the experiments, operating waveforms at relevant points were actually measured while the power supply device 1 according to the fourth embodiment was operated with the following settings: input/output voltages, 600 V; output power, 5 kW; and switching frequency, 182 kHz.

Used as the primary-side switching elements Q*1 and Q*2 were SiC-based MOSFETs (with a withstand voltage of 1200 V and a withstand current of 40 A), and used as the secondary-side rectification diodes D*3 and D*4 were SiC-based SBDs (Schottky barrier diodes) (with a withstand voltage of 1200 V and a withstand current of 10 A).

The resonance capacitors C*1 and C*2 each had a capacitance of 60 nF. The composite excitation inductances provided by the two transformers T*2X and T*2Y for the respective phases (phases 1, 2, and 3) were 110.7 µH, 116.1 µH, and 113.7 µH respectively. The composite leakage inductances provided by the first transformers T*1 and the two second transformers T*2X and T*2Y for the respective phases (phases 1, 2, and 3) were 12.0 µH, 11.6 µH, and 11.6 µH respectively. The errors among the inductance values in the respective phases occurred unintentionally during fabrication.

Figure 14:
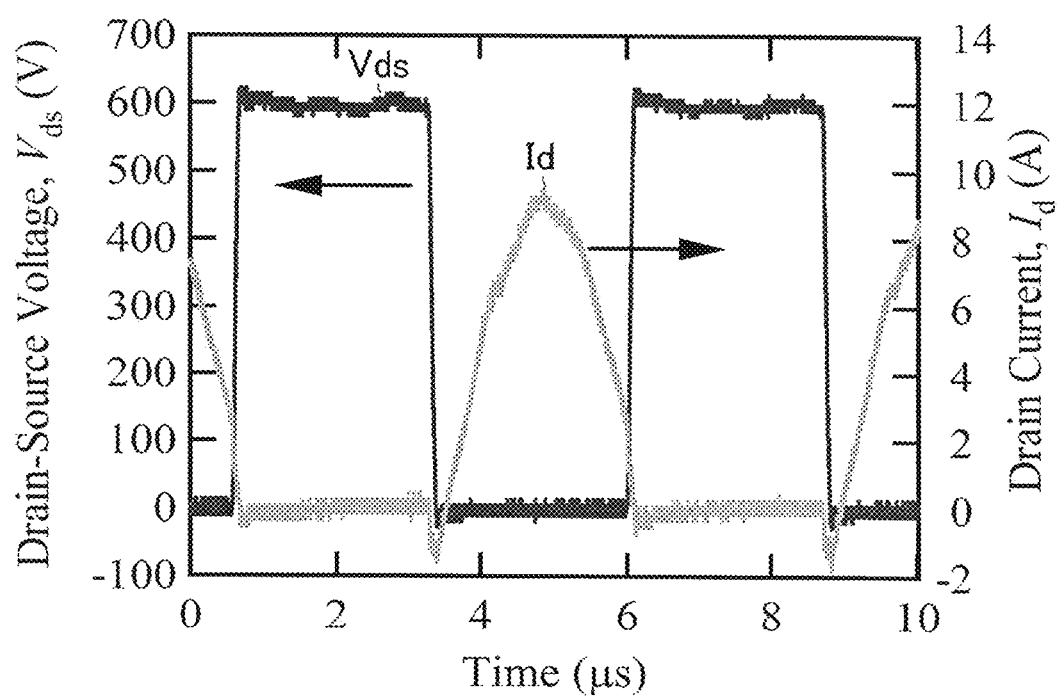
FIG. 14 is an actually measured waveform diagram showing the drain current and the drain-source voltage of a primary-side SiC MOSFET (with input/output voltages, 600 V; output power, 5 kW; switching frequency, 182 kHz)

FIG. 14 is an actually measured waveform diagram showing the drain current Id (right-hand vertical axis) and the drain-source voltage Vds (left-hand vertical axis) of the primary-side SiC MOSFET. For example, in a case where the switching element Q12 is the primary-side SiC MOSFET that is the target of actual measurement, the drain current Id corresponds to the switch current Iq12 mentioned previously, and the drain-source voltage Vds corresponds to the drain-source voltage Vds12 mentioned previously. The actually measured waveforms shown in FIG. 14 agree well with the simulation waveforms shown in the timing chart in FIG. 4.

Figure 15:
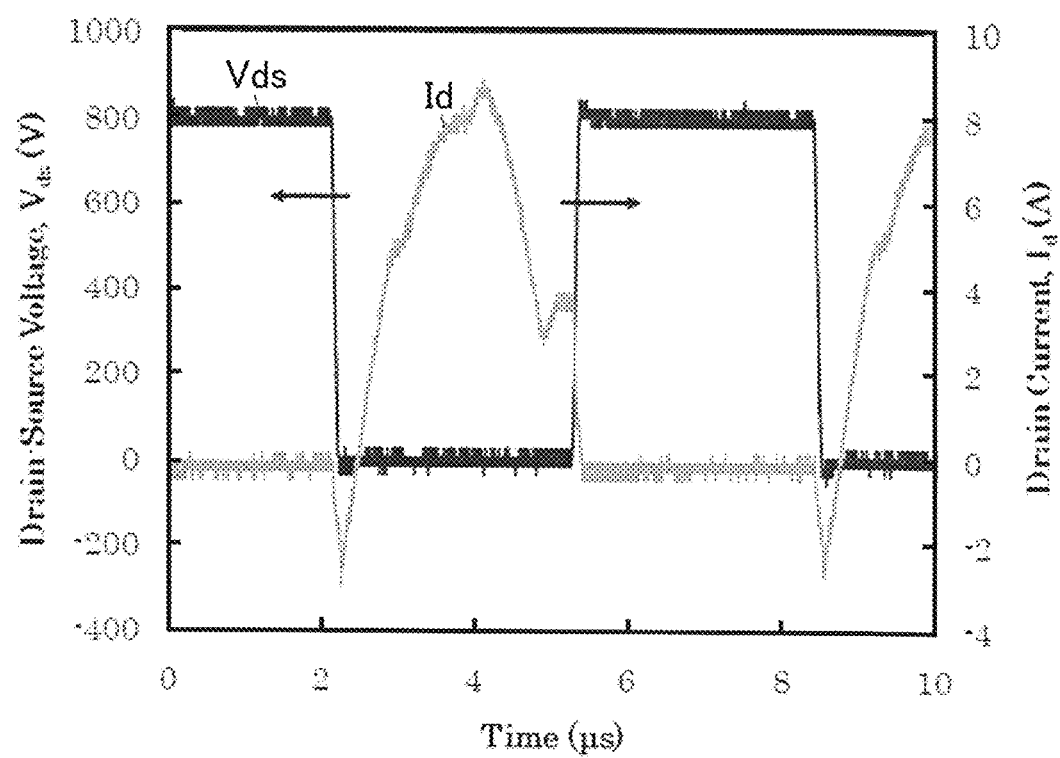
FIG. 15 is an actually measured waveform diagram showing the drain current and the drain-source voltage of a primary-side SiC MOSFET (with input/output voltages, 800 V; output power, 5 kW; switching frequency, 162 kHz)

On the other hand, FIG. 15 is an actually measured waveform diagram, similar to FIG. 14, obtained when the power supply device 1 according to the fourth embodiment was operated, with a circuit configured with circuit constants similar to those in FIG. 13, with the following settings: input/output voltages, 800 V; output voltage, 5 kW; and switching frequency, 162 kHz. What is shown there proves that using SiC MOSFETs with a withstand voltage of 1200 V makes it possible to perform operation that cannot be achieved with Si FETs with a withstand voltage of about 900 V.

Figure 16:
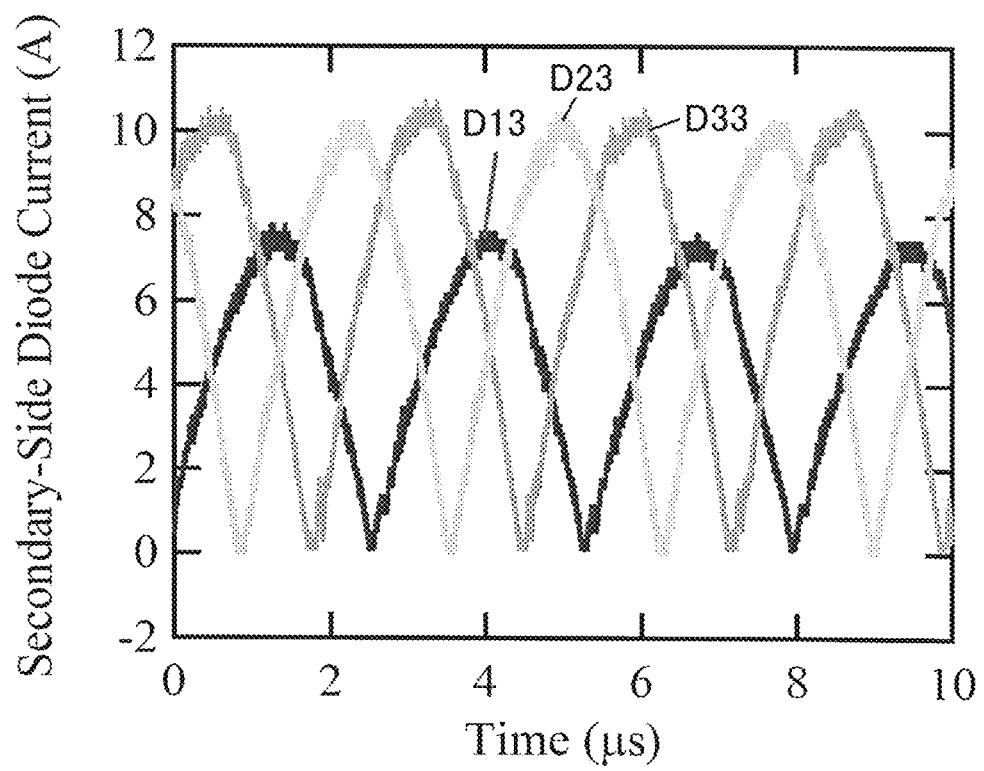
FIG. 16 is an actually measured waveform diagram showing the forward currents through secondary-side SiC SBDs (without current balancing)
Figure 17:
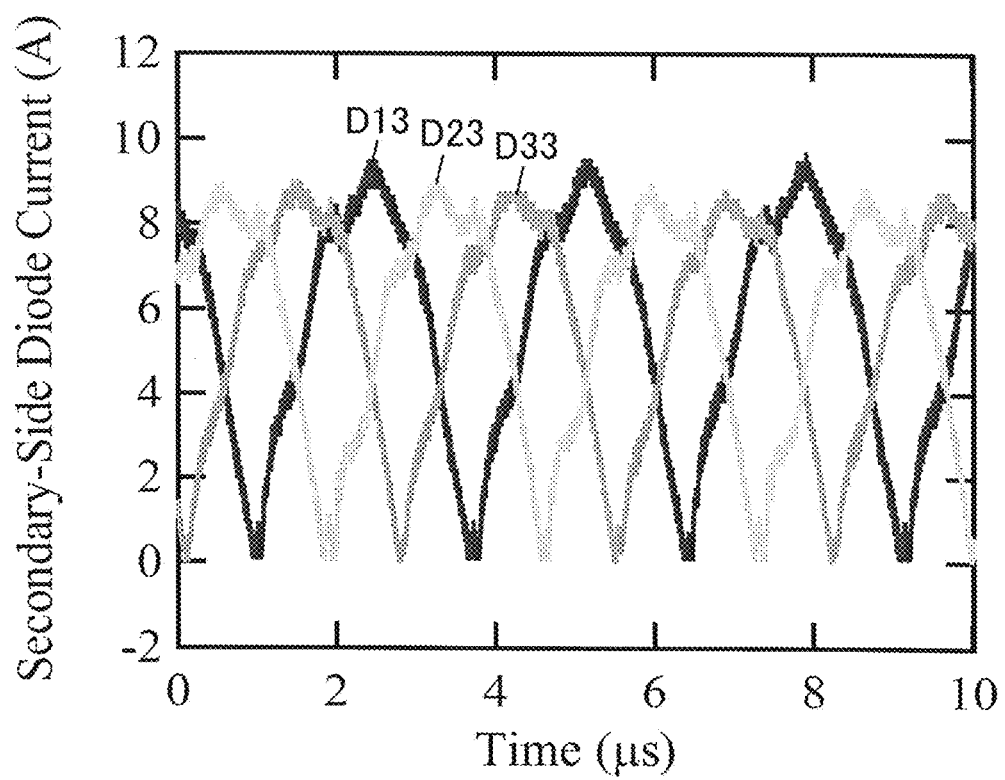
FIG. 17 is an actually measured waveform diagram showing the forward currents through secondary-side SiC SBDs (with current balancing)

FIGS. 16 and 17 are actually measured waveform diagrams showing the forward currents through the secondary-side SiC SBDs (in the illustrated example, the rectification diodes D13, D23, and D33) as actually measured under the circuit conditions shown in FIG. 13. FIG. 16 shows a case with no current balancing, and FIG. 17 shows a case with current balancing. From a comparison of the two diagrams, it will be clearly seen that the current-balancing operation described previously makes the forward currents in the respective phases even.

FIG. 18 is a comparison table of the sum current average value and the after-summation ripple current. As shown there, the sum current average value was 17.0 A without current balancing and 16.7 A with current balancing. The after-summation ripple current was 6.45 A (37.8%) without current balancing and 4.30 A (25.7%) with current balancing. Thus, an improvement was confirmed as to the ripple current.

To conclude the description, irregularities that occur in the current waveforms when current balancing is in operation will be studied. Through current-balancing operation, in whichever phase has a low current, an electromotive force in the first transformer T*1 increases the substantial input voltage, and thus the current increases. Reversely, in whichever phase has a high current, an electromotive force in the first transformer T*1 decreases the substantial input voltage, and thus the current decreases.

Thus, when the magnitude relationship among currents reverses, the direction of electromotive forces reverses, and thus when current balancing is in operation, current oscillation occurs in accordance with the switching of electromotive forces and the response speed of currents. Thus, oscillation of the order of ten and several megahertz occurs, and appears quite separately from the switching frequency.

Incidentally, when the circuit constants of the transformers, switching elements, etc. happen to be close to each other among the different phases under particular conditions, even without the current-balancing circuit in operation, the current waveforms in the respective phases are approximately the same. Thus, it is not possible to check whether or not the current-balancing circuit is operating normally simply by monitoring the ripple current in the output capacitors.

In a case where, for the sake of discussion, the current waveforms of the respective phases happen to be the same despite the current-balancing circuit not operating normally, a change in the environmental conditions may result in failure to achieve a current balance. Thus, to achieve a current balance whatever deviation occurs in circuit constants, it is preferable to confirm that the current-balancing circuit is operating normally.

Accordingly, the currents can be measured by the current detection circuits 14-\* when the power supply device 1 is in actual operation, or the currents through the switching elements or through the rectifying elements can be measured at the time of assembly or operation checking of the power supply device 1, as methods for checking whether or not current oscillation (irregularities in the current waveforms) at a frequency other than the resonance frequency is occurring. As mentioned previously, when current balancing is in operation, current oscillation at a frequency different from the switching frequency occurs. Accordingly, based on whether or not there is current oscillation, it is possible to easily check whether or not the current-balancing circuit is operating normally, and to properly discriminate a fault in the circuit and enhance the reliability of the power supply device 1.

For example, a checker can be provided that is configured to perform automatically a checking process as described above when the power supply device 1 is started up or operated in a test mode and then feed the results to a host (such as a microcomputer provided outside the power supply device 1). The control circuit 15 described previously may be equipped with the function of such a checker. Instead, a checking process as described above may be performed from outside the power supply device 1 at the time of inspection or the like of the power supply device 1 prior to shipment.

Other Modified Examples

The various technical features disclosed herein may be implemented in any other manner than specifically described by way of embodiments above, and allows for many modifications within the scope of the technical ingenuity of the invention. That is, the embodiments described above should be considered to be in every aspect illustrative and not restrictive, and the technical scope of the present invention should be understood to be defined not by the description of embodiments given above but by the appended claims and to encompasses any modifications in the sense and scope equivalent to those of the claims.

INDUSTRIAL APPLICABILITY

Power supply devices according to the present invention find applications as isolated power supply devices in industrial machinery and infrastructure equipment, and can be suitably used for the purpose of isolating, in particular, appliances that use commercial AC power sources around AC 400 V.

LIST OF REFERENCE SIGNS

1 power supply device
10, 10-\* (where \*=1, 2, 3) LLC resonant DC-DC converter
10$p$ primary circuit system
10$s$ secondary circuit system
10$c$ control circuit system
11, 11-\* switching circuit
12, 12-\* serial resonant circuit
13, 13-\* rectifying-smoothing circuit
14-\* current detection circuit
15 control circuit
16-\* insulated-gate driver circuit
17 output feedback circuit
18 current balance control circuit
20 DC power supply circuit
100 split bobbin
101 top portion
102 bottom portion
103 splitting portion
104 first reel portion
105 second reel portion
106 cavity portion
200 core
210, 220 E-shaped core member
211, 221 middle leg portion
212, 222 side leg portion
230 gap portion
Q1, Q2 switching element
Q*1, Q*2 first switching element (SiC MISFET)
Q41 second switching element
TR1 isolation transformer
T*1 first transformer (balance transformer)
T*2, T*2X, T*2Y second transformer (main transformer)
T*1$a$, T*2$a$, T*2X$a$, T*2Y$a$ primary winding
T*1$b$, T*2$b$, T*2X$b$, T*2Y$b$ secondary winding
Lp*a, Lp*b excitation inductance
Ls* leakage inductance
D1, D2, D*1, D*2 rectification diode
D*3, D*4 rectification diode (SiC SBD)
D41, D42 diode
C1, Co, Co1, Co2 smoothing capacitor
Ls, Lp reactor
Cr1, Cr2, C*1, C*2 resonant capacitor
L1 primary winding
L2 secondary winding

The invention claimed is:
1. A power supply device comprising:
three-phase resonant DC-DC converters which are connected in parallel between an input node of a DC input voltage and an output node of a DC output voltage and of which operation phases are displaced from each other by 120 degrees, wherein
the resonant DC-DC converters respectively include:
 switching circuits which convert DC to AC by switching the DC input voltage by using first switching elements respectively;
 serial resonant circuits which are connected to output nodes of the switching circuits respectively; and
 rectifying-smoothing circuits which are connected to output nodes of the serial resonant circuits respectively, the serial resonant circuits respectively include first transformers, second transformers, and resonance capacitors, primary windings of the first transformers, primary windings of the second transformers, and the resonance capacitors are connected in series with each other respectively, secondary windings of the second transformers are connected to the rectifying-smoothing circuits respectively, the first transformers respectively include separate cores, and respectively have the primary and secondary windings isolated from each other with leakage inductances present between the primary and secondary windings, the secondary windings of different phases being connected in parallel with each other.

2. The power supply device of claim 1, wherein the first transformers respectively have the primary and secondary windings isolated by split bobbins.

3. The power supply device of claim 1, further comprising:

a current detection circuit which is provided on a secondary winding side of the first transformers and which detect currents that pass through the secondary windings; and a control circuit which monitors a resonance state and also controls and protects the first switching elements in accordance with a result of detection by the current detection circuit.

4. The power supply device of claim 1, further comprising:

second switching elements which are respectively provided on a secondary winding side of the first transformers and which respectively short-circuit the secondary windings of the first transformers in accordance with a current balance control signal.

5. The power supply device of claim 4, wherein the current balance control signal has, when the power supply device is in a light-load condition, such a logic level as to let the secondary windings be short-circuited.

6. The power supply device of claim 1, wherein the first switching elements are all SiC-based MISFETs (metal-insulator-semiconductor field-effect transistors).

7. The power supply device of claim 1, further comprising:

a checker configured to check whether or not a current-balancing operation is normal based on whether or not current oscillation is occurring at a frequency other than a resonance frequency of the serial resonant circuits.

* * * * *